United States Patent
Ballands et al.

(10) Patent No.: US 9,923,941 B2
(45) Date of Patent: Mar. 20, 2018

(54) METHOD AND SYSTEM FOR DYNAMIC PROXIMITY-BASED MEDIA SHARING

(71) Applicant: International Business Machines Corporation, Armonk, NY (US)

(72) Inventors: Andrew J. Ballands, Austin, TX (US);
Kyle J. Craig, Austin, TX (US);
Michael D. Kistler, Austin, TX (US);
Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 14/933,102

(22) Filed: Nov. 5, 2015

(65) Prior Publication Data

US 2017/0134455 A1    May 11, 2017

(51) Int. Cl.
*G06F 15/16*   (2006.01)
*H04L 29/06*   (2006.01)
*H04L 29/12*   (2006.01)
*G06F 17/30*   (2006.01)
*H04W 4/00*    (2018.01)

(52) U.S. Cl.
CPC .... *H04L 65/4076* (2013.01); *G06F 17/30047* (2013.01); *G06F 17/30244* (2013.01); *H04L 61/00* (2013.01); *H04L 67/42* (2013.01); *H04W 4/00* (2013.01)

(58) Field of Classification Search
CPC ............... H04L 29/12009; H04L 51/20; H04L 61/1541; H04L 61/1547; H04L 67/104–67/1068; H04L 67/18; H04L 61/00; G06F 17/3011; G06F 17/30041; G06F 17/30047; G06F 17/30241; G06F 17/30244; G06F 17/30268; G06F 17/30861–17/3087; G06F 17/301; H04W 4/00; H04W 8/005
See application file for complete search history.

(56) References Cited

U.S. PATENT DOCUMENTS 5,760,917 A * 6/1998 Sheridan ............. H04N 1/2179
                                                    348/211.3
6,301,607 B2 * 10/2001 Barraclough ....... G06F 17/3089
                                                    348/207.1

(Continued)

OTHER PUBLICATIONS

"Panoramio Help: Uploading and Mapping Photos", http://www.panoramio.com/help/adding_photos#mapping_photos, Dec. 8, 2013, 5 pages.

(Continued)

*Primary Examiner* — Brendan Higa
(74) *Attorney, Agent, or Firm* — Maeve M. Carpenter; Maxine L. Barasch; Keohane & D'Alessandro, PLLC

(57) ABSTRACT

Disclosed embodiments provide an approach for sharing media items between mobile devices that are in proximity to one another. A device ID is generated and shared with nearby devices. Media items are uploaded to a data server and then sent from the data server to other devices that request them based on a shared device ID. Users do not need to know each other or be connected to each other in any social media sense, and yet can still share media items. Thus, disclosed embodiments provide a new level of crowd-sourced coverage of an event based on sharing of media items.

15 Claims, 13 Drawing Sheets

(56) References Cited

U.S. PATENT DOCUMENTS

| | | | | |
|---|---|---|---|---|
| 7,203,772 B2* | 4/2007 | Shieh | | H04W 8/26 |
| | | | | 455/41.2 |
| 7,433,710 B2* | 10/2008 | Bodnar | | G06Q 30/02 |
| | | | | 348/207.1 |
| 7,970,418 B2 | 6/2011 | Schmidt et al. | | |
| 8,350,946 B2 | 1/2013 | Jung et al. | | |
| 8,447,769 B1 | 5/2013 | Paris et al. | | |
| 8,667,053 B2* | 3/2014 | Fredlund | | H04N 1/324 |
| | | | | 709/203 |
| 2003/0004916 A1 | 1/2003 | Lewis | | |
| 2005/0096084 A1* | 5/2005 | Pohja | | G06F 17/30038 |
| | | | | 455/556.1 |
| 2006/0092316 A1* | 5/2006 | Gazeley | | H04N 5/23241 |
| | | | | 348/372 |
| 2006/0200534 A1* | 9/2006 | Nagai | | H04N 7/17318 |
| | | | | 709/212 |
| 2008/0033903 A1* | 2/2008 | Carol | | G06F 17/30722 |
| 2008/0039058 A1* | 2/2008 | Ray | | H04W 28/14 |
| | | | | 455/414.3 |
| 2009/0016255 A1* | 1/2009 | Park | | H04W 8/005 |
| | | | | 370/312 |
| 2009/0058611 A1* | 3/2009 | Kawamura | | H04N 7/185 |
| | | | | 340/10.1 |
| 2009/0144786 A1* | 6/2009 | Branam | | H04N 5/44543 |
| | | | | 725/109 |
| 2009/0213245 A1* | 8/2009 | Harper | | G11B 27/11 |
| | | | | 348/231.3 |
| 2009/0259623 A1* | 10/2009 | Mooneyham | | G06F 17/30038 |
| 2009/0319472 A1 | 12/2009 | Jain et al. | | |
| 2010/0156676 A1* | 6/2010 | Mooring | | G06F 3/017 |
| | | | | 341/20 |
| 2010/0158315 A1 | 6/2010 | Martin | | |
| 2010/0191968 A1* | 7/2010 | Patil | | H04L 9/3236 |
| | | | | 713/170 |
| 2010/0194896 A1* | 8/2010 | Heimendinger | | H04N 1/00132 |
| | | | | 348/207.1 |
| 2012/0041982 A1* | 2/2012 | Jennings | | G06F 17/30265 |
| | | | | 707/784 |
| 2012/0242841 A1* | 9/2012 | Escol | | H04L 65/602 |
| | | | | 348/207.1 |
| 2012/0324589 A1 | 12/2012 | Nukala et al. | | |
| 2013/0086223 A1* | 4/2013 | Yoneyama | | H04L 67/42 |
| | | | | 709/219 |
| 2013/0286223 A1* | 10/2013 | Latta | | H04N 1/00347 |
| | | | | 348/207.1 |
| 2014/0109231 A1* | 4/2014 | Takaoka | | G06F 21/60 |
| | | | | 726/26 |
| 2014/0153837 A1 | 6/2014 | Steiner | | |
| 2014/0168354 A1* | 6/2014 | Clavel | | H04N 7/152 |
| | | | | 348/14.09 |
| 2014/0219629 A1* | 8/2014 | McIntosh | | G11B 27/105 |
| | | | | 386/241 |
| 2014/0267791 A1 | 9/2014 | Rainisto | | |
| 2015/0095416 A1* | 4/2015 | Abiri | | H04W 4/023 |
| | | | | 709/204 |
| 2015/0356289 A1* | 12/2015 | Brown | | G06F 21/44 |
| | | | | 726/7 |

OTHER PUBLICATIONS

"Google Photos", www.google.com/photos, Jul. 29, 2015, 1 page.
"Capsule—An Innovative Wedding Photo App & Photo Sharing Tool", http://trycapsule.com, Jan. 21, 2015, 6 pages.

* cited by examiner

METHOD AND SYSTEM FOR DYNAMIC PROXIMITY-BASED MEDIA SHARING

FIELD OF THE INVENTION

The present invention relates generally to digital media, and more particularly to a method and system for dynamic proximity-based media sharing.

BACKGROUND

Mobile devices have enabled more media items to be generated than in years past. Most mobile devices contain still cameras, video cameras, and microphones. In addition, mobile devices such as smartphones and tablet computers typically contain a variety of other interfaces and peripherals such as network interfaces and geolocation receivers. Thus, mobile devices are an ideal platform for sharing media items. However, although sharing media items is possible, there remain situations where sharing is not convenient. It is therefore desirable to have improvements in media sharing.

SUMMARY

In a first aspect, embodiments of the present invention provide a method of sharing media from a mobile device comprising: broadcasting an internal device identifier; recording a media item to the mobile device; associating the internal device identifier with the recorded media item; sending the media item and associated internal device identifier to a data server; receiving one or more external device identifiers from nearby devices; requesting media items from the data server based on the one or more external device identifiers; and receiving the requested media items.

In a second aspect, embodiments of the present invention provide a method of sharing media based on event proximity, comprising: receiving a plurality of media items, wherein each media item comprises a corresponding device identifier; receiving a media request, wherein the media request includes a requested device identifier; and providing a media response, wherein the media response includes one or more media items having corresponding device identifiers that match the requested device identifier.

In a third aspect, embodiments of the present invention provide a mobile device comprising: a processor; a memory coupled to the processor; a network interface coupled to the processor; a local transceiver coupled to the processor; a media recording apparatus coupled to the processor; a geolocation receiver coupled to the processor; wherein the memory contains instructions, which when executed by the processor, perform the steps of: broadcasting an internal device identifier using the local transceiver; recording a media item from the media recording apparatus to the memory; associating the internal device identifier with the recorded media item; sending the media item and associated internal device identifier to a data server; receiving one or more external device identifiers from nearby devices; requesting media items from the data server based on the one or more external device identifiers; and receiving the requested media items and storing the requested media items in the memory.

BRIEF DESCRIPTION OF THE DRAWINGS

Features of this invention will be more readily understood from the following detailed description of the various aspects of the invention taken in conjunction with the accompanying drawings. The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Example embodiments will now be described more fully herein with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide methods and systems for sharing media amongst mobile devices. Users are not required to have any prior knowledge of each other. Media sharing is defined by attendance at an event. An event is defined by time and location. When two devices are at the same location at the same time, they exchange a device identifier (device ID) that allows media items to be uploaded and/or downloaded at a later time. In this way, attendees at events such as dance recitals, soccer games, and parties can share media with other users who were there at the same time. Since people have different vantage points, this allows users to obtain photos from a variety of angles and views when attending events.

Figure 1:
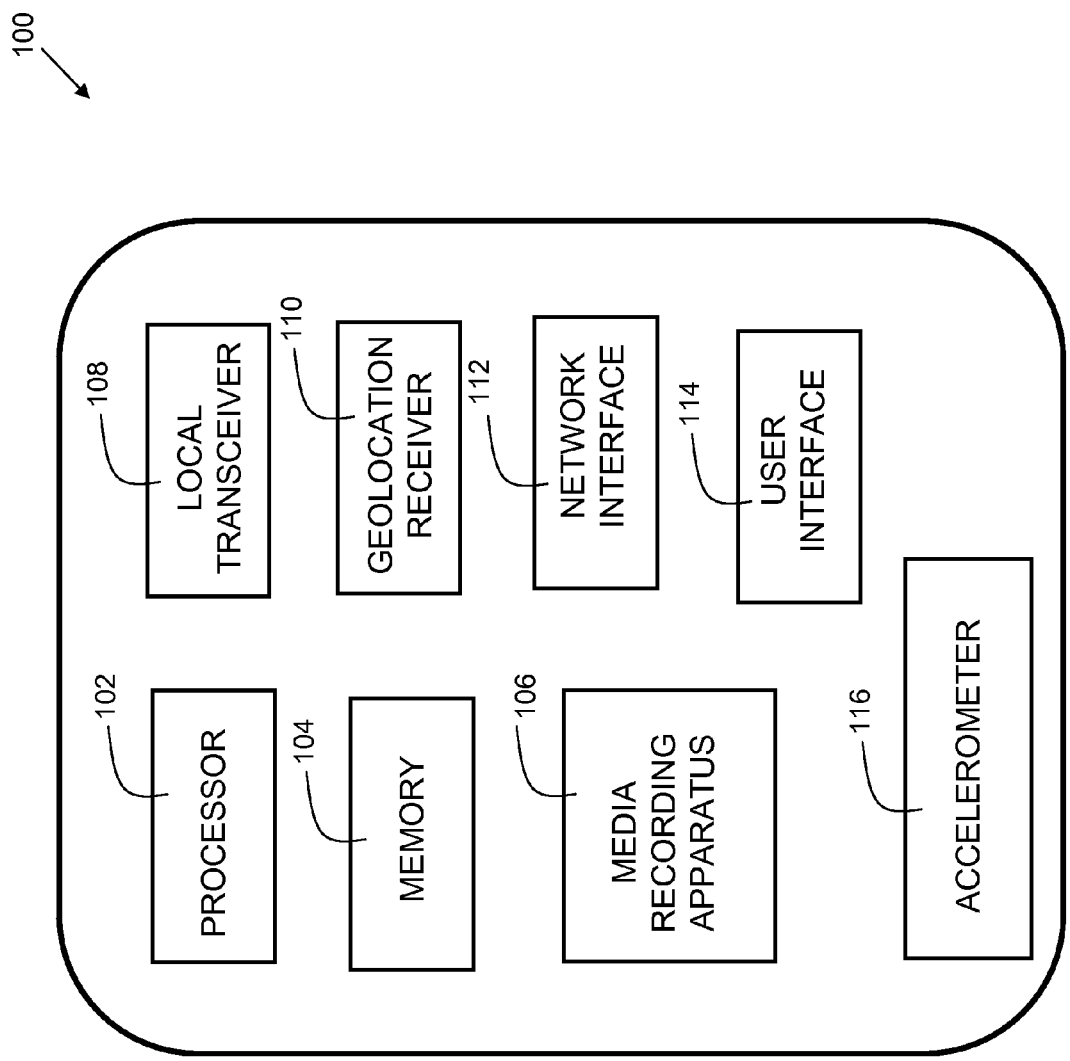
FIG. 1 shows an exemplary mobile device in accordance with embodiments of the present invention.

FIG. 1 shows an exemplary mobile device 100 in accordance with embodiments of the present invention. The mobile device 100 includes a processor 102 which is coupled to memory 104. Memory 104 contains instructions, that when executed by the processor 102, perform the various methods in accordance with illustrative embodiments. In addition to the processor 102 and memory 104, mobile device 100 includes various other peripherals, including, but not limited to, a media recording apparatus 106. The media recording apparatus 106 may include a video camera, still camera, audio recording device, or combination thereof. Hence, the media recording apparatus 106 is capable of recording media items, including, but not limited to, photographs, video files, and audio files, and storing them in memory 104. Mobile device 100 further may include a local transceiver 108. The local transceiver 108 includes a transmitter and receiver for local radio frequency (RF) signals. In embodiments, the local transceiver may include a Bluetooth transceiver, Zigbee transceiver, or other near field communication (NFC) transceiver. Mobile device 100 further may include a geolocation receiver 110. The geolocation receiver may be configured to receive signals from multiple satellites to triangulate a position on Earth. In embodiments, the geolocation receiver 110 includes a Global Positioning System (GPS) receiver, GLONASS receiver, Galileo receiver, or other satellite based positioning system. The mobile device 100 further includes a network interface 112. Network interface 112 may include a cellular network interface, a WiFi interface, such as an IEEE 802.11 interface, or other suitable network interface. Mobile device 100 may further include a user interface 114. User interface 114 may include a touch screen and provides a user with the ability to enter information as necessary to establish settings to determine operation in accordance with embodiments of the present invention. The mobile device 100 may further include an accelerometer 116 which may be used to detect motion of the mobile device, as well as to determine a correct orientation for media items such as videos and photographs. In some embodiments, mobile device 100 may be a smart phone or tablet computer. The mobile device has the capability to record media items with media recording apparatus 106 and store them in memory 104. The device may further include additional storage such as a magnetic hard disk, flash memory, or other suitable storage device for storing media.

Embodiments of the present invention facilitate sharing of media items amongst users of a mobile device such as mobile device 100. When people congregate in groups for an event, it is desirable to share media items with others at that event. This allows users to collect media items taken at different vantage points. However, there are additional reasons beyond multiple vantage points for sharing media, including, but not limited to, media integrity and fidelity. For example, some members of a group may have higher resolution cameras than others, and thus sharing of the higher quality images can be achieved with embodiments of the present invention. Furthermore, with embodiments of the present invention, the users do not need to know each other or have any social media connection in order to share media items. The criteria for sharing of media items includes being at the same event. For the purposes of this disclosure, an event is considered to be a temporal and proximal relationship between at least two mobile device users.

For example, consider the case of a parent attending a school play in which their child is on stage. While the parent is seated in the audience, they have a particular vantage point for taking photos and videos. Other audience members, typically other parents, are also taking photos and videos from other vantage points. Embodiments of the present invention allow the different audience members to share media from that event with other people who also attended the event, even if they do not know each other. The following figures further illustrate details of how the event determination is made, and how the sharing is performed, in accordance with illustrative embodiments.

Figure 2A:
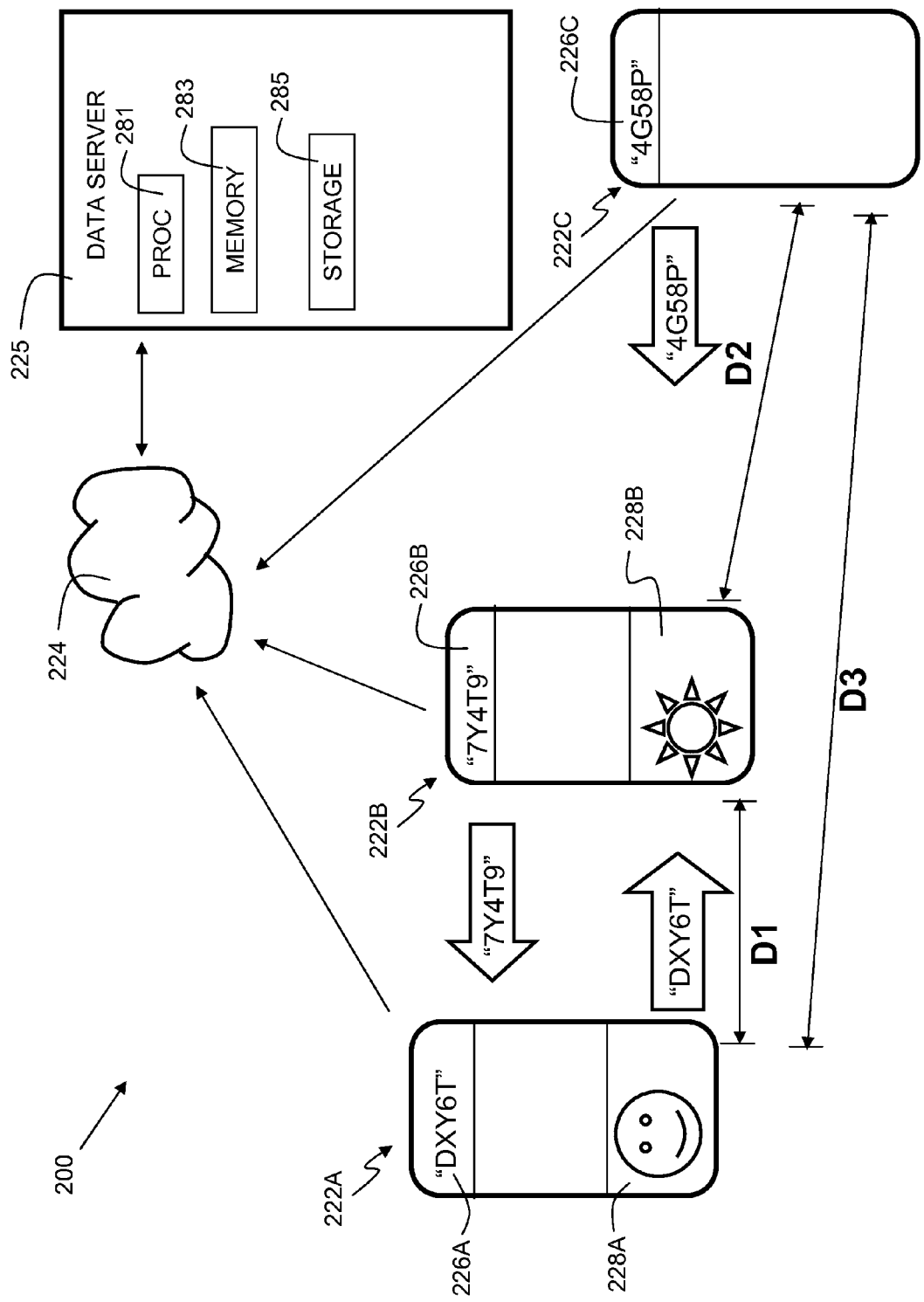
FIG. 2A shows a block diagram of a media sharing example during a device identification broadcast.

FIG. 2A shows a block diagram 200 of a media sharing example during a device identification broadcast. A device identification broadcast is part of a device identification process in which nearby devices indicate presence to each other. In block diagram 200, three mobile devices (222A, 222B, and 222C) are shown. While the mobile devices 222A, 222B, and 222C may not be identical, each device has at least the functionality indicated by mobile device 100 of FIG. 1. Mobile device 222A and mobile device 222B are physically separated by a distance D1. Mobile device 222B and mobile device 222C are physically separated by a distance D2. Mobile device 222A and 222C are physically separated by a distance D3. In this example, distance D1<D2<D3.

Each mobile device creates a device identification string (device ID) and broadcasts it using its local transceiver for other mobile devices to receive. That is, embodiments include broadcasting an internal device identifier by transmitting the internal device identifier via a local radio transmitter or local transceiver. Device 222A creates device ID 226A with the value "DXY6T" and broadcasts it using its local transceiver. Device 222B creates device ID 226B with the value "7Y4T9" and broadcasts it using its local transceiver. Device 222C creates device ID 226C with the value "4G58P" and broadcasts it using its local transceiver. In embodiments, device ID values may be randomly generated, such that subsequent device IDs do not appear to follow a particular pattern. The local transceiver has a limited range. In embodiments, the local transceiver may operate at a range from about 1 foot to about 100 feet. Thus, when two mobile devices are in proximity to one another, they can share device IDs with each other. The local transceiver range enforces the proximity of the mobile devices. In this example, distance D1 is less than the local transceiver range, and distances D2 and D3 are both greater than the local transceiver range. Thus, mobile device 222A and mobile device 222B are able to exchange device IDs, whereas mobile device 222C is out of range from mobile device 222A and mobile device 222B and cannot share device IDs with mobile device 222A and mobile device 222B. Mobile device 222A has media item 228A stored in its memory. For example, media item 228A may be a photo taken with a camera integrated in mobile device 222A. Similarly, mobile device 222B has media item 228B stored in its memory. For example, media item 228B may be a photo taken with a camera integrated in mobile device 222B. Each mobile device communicates via network 224 to a data server 225. In embodiments, network 224 may include the Internet. The data server 225 may include a processor 281, memory 283, and storage 285. The processor 281 is coupled to the memory 283 such that it can access instructions stored in memory 283. The processor 281 executes the instructions in implementation of embodiments of the present invention. The storage 285 may include one or more hard disks, or other suitable storage technology. Note that while one data server is illustrated in diagram 200, in practice, there may be multiple data servers 225 operating in a distributed manner for load balancing and data redundancy. In embodiments, data servers 225 may implement an object store system utilizing a cloud-based architecture.

Figure 2B:
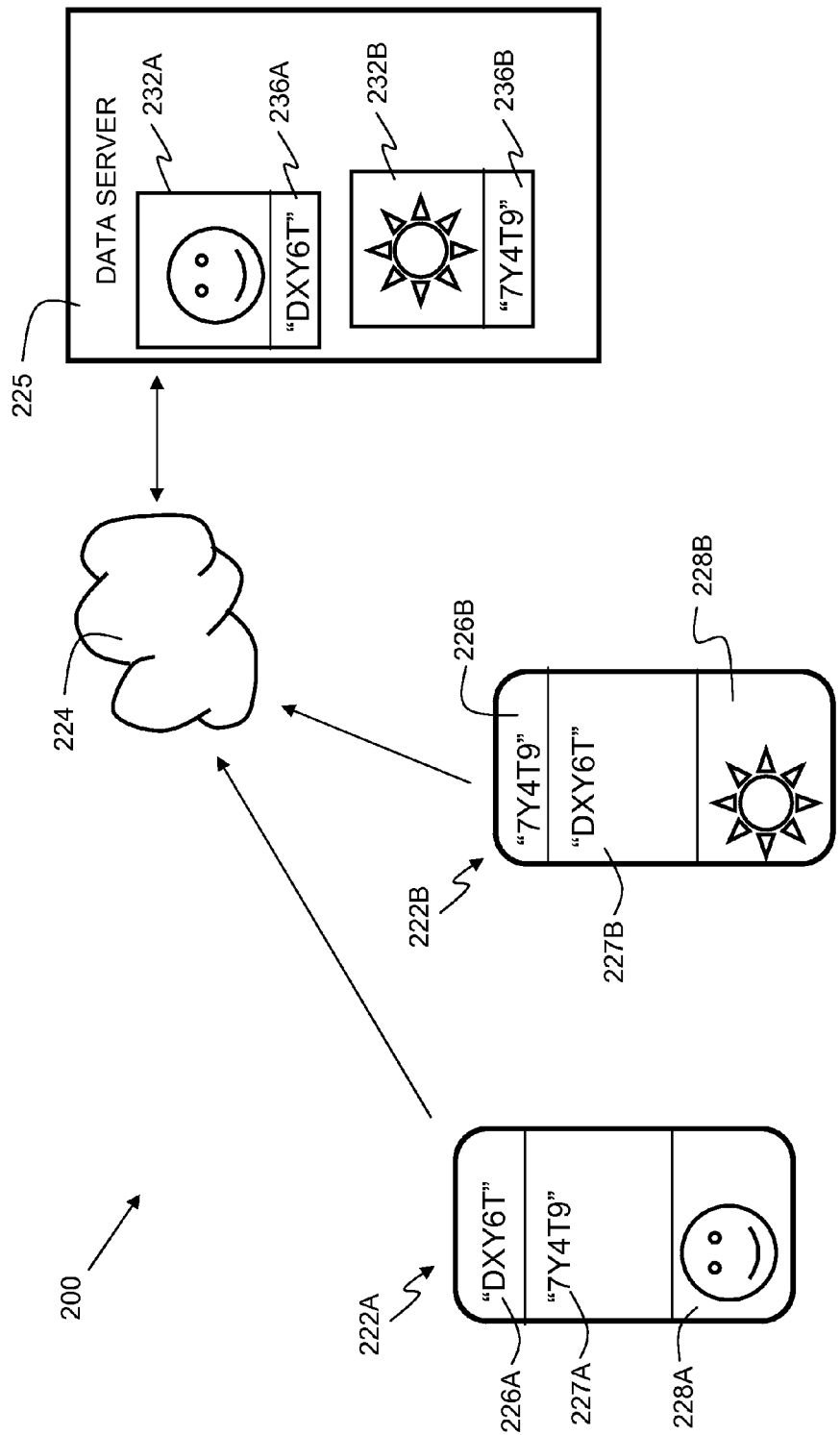
FIG. 2B shows a block diagram of a media sharing example illustrating a media upload process.

FIG. 2B shows block diagram 200 of a media sharing example illustrating a media upload process. At this point, device 222A has received a remote device ID 227A from device 222B. Similarly, device 222B has received a remote device ID 227B from device 222A. Hence, the remote device ID 227A is the local device ID 226B of device 222B. Similarly, the remote device ID 227B is the local device ID 226A of device 222A. The devices upload their stored media items via network 224 to data server 225. For clarity, the processor 281, memory 283, and storage 285 are not shown in FIGS. 2B, 2C, and 2D, in order to more clearly illustrate the data server functionality. As shown in data server 225 in FIG. 2B, data server 225 stores media item 232A and associated device ID 236A. Media item 232A is a copy of media item 228A which was acquired by mobile device 222A. In some embodiments, media item 232A may be an exact copy of media item 228A. In other embodiments, media item 232A may be a scaled down, transcoded, cropped, or otherwise size-reduced version, or other modification of the originally acquired media item 228A. Similarly, media item 232B is a copy of media item 228B from mobile device 222B. The associated device ID 236B is also stored with, and associated with, media item 232B. In embodiments, the mobile devices may upload the media items shortly after they are acquired. In other embodiments, the mobile devices can defer uploading to another time, such as when a faster network connection is available. For example, to conserve mobile data usage, the mobile devices may only upload media items such as photos and videos while connected to the Internet through WiFi. In some embodiments, the upload may be scheduled to low-usage times such as overnight hours. At this point, the data server 225 stores media items, and the associated device ID for each of those media items.

Figure 2C:
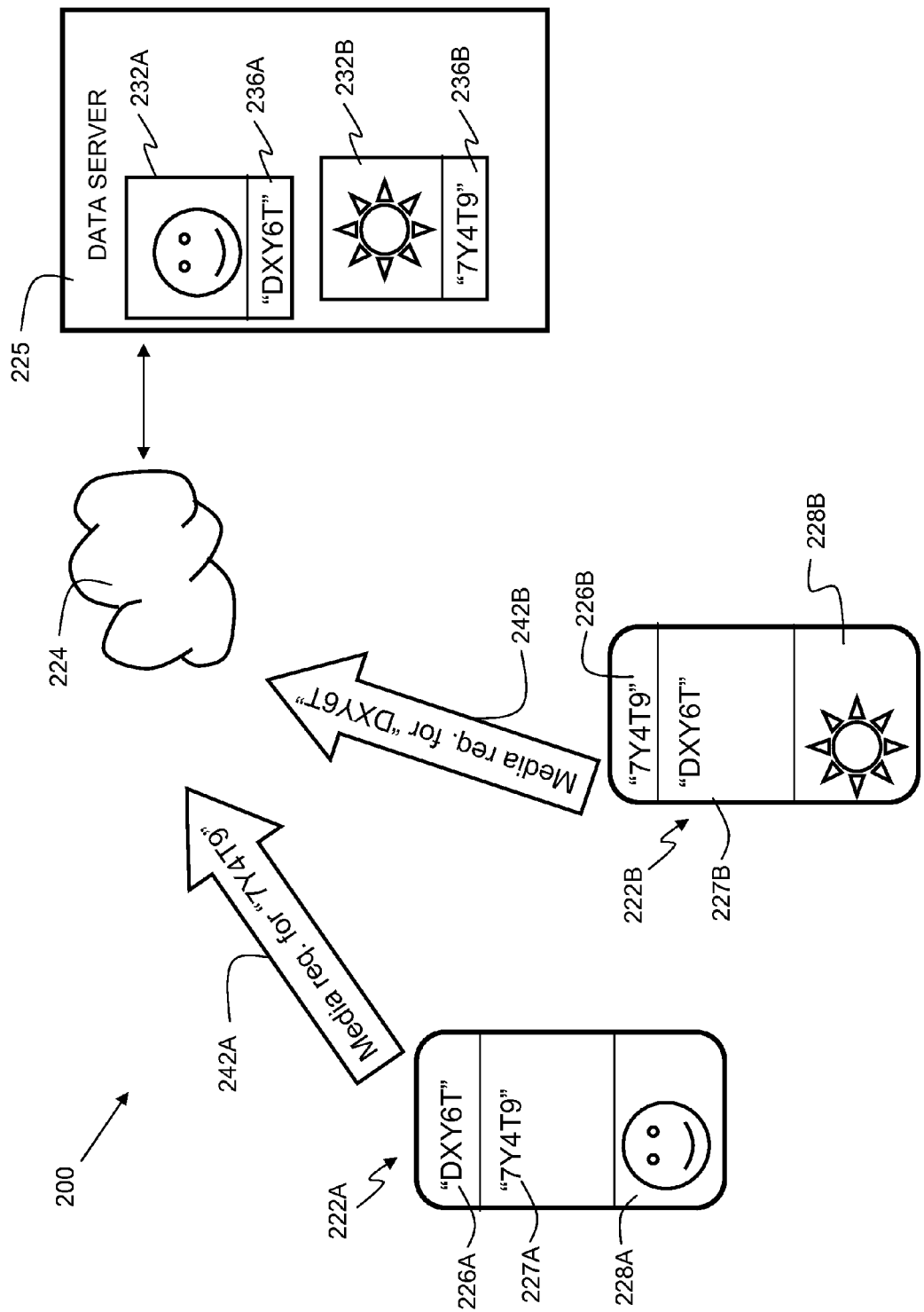
FIG. 2C shows a block diagram of a media sharing example illustrating a media request process.

FIG. 2C shows block diagram 200 of a media sharing example illustrating a media request process. Similar to the uploading of media items described for FIG. 2B, this process may take place at some later time, when high-speed Internet connectivity is available. The process does not need to take place at the time of the event where the media items are acquired (e.g., when photos are taken). For example, to conserve mobile data usage, the mobile devices may only request media items such as photos and videos while connected to the Internet through WiFi. In some embodiments, the request and download of media items may be scheduled to low-usage times such as overnight hours. As shown in FIG. 2C, mobile device 222A sends media request 242A to data server 225 via network 224. The media request 242A contains the remote device ID 227A. While the example of FIG. 2C shows only one remote device ID, in practice there may be many remote device IDs from multiple nearby mobile devices. In such a case, the media request 242A may contain multiple remote device IDs, or multiple requests with different remote device IDs can be made, such that the data server 225 receives requests for all of the remote device IDs stored within a mobile device. In a similar manner, mobile device 222B sends a media request to the data server 225 via network 224. The request 242B is basically telling the data server to send media items with a corresponding device ID of "DXY6T" to device 222B. Similarly, the request 242A is basically telling the data server to send media items with a corresponding device ID of "7Y4T9" to device 222A.

Figure 2D:
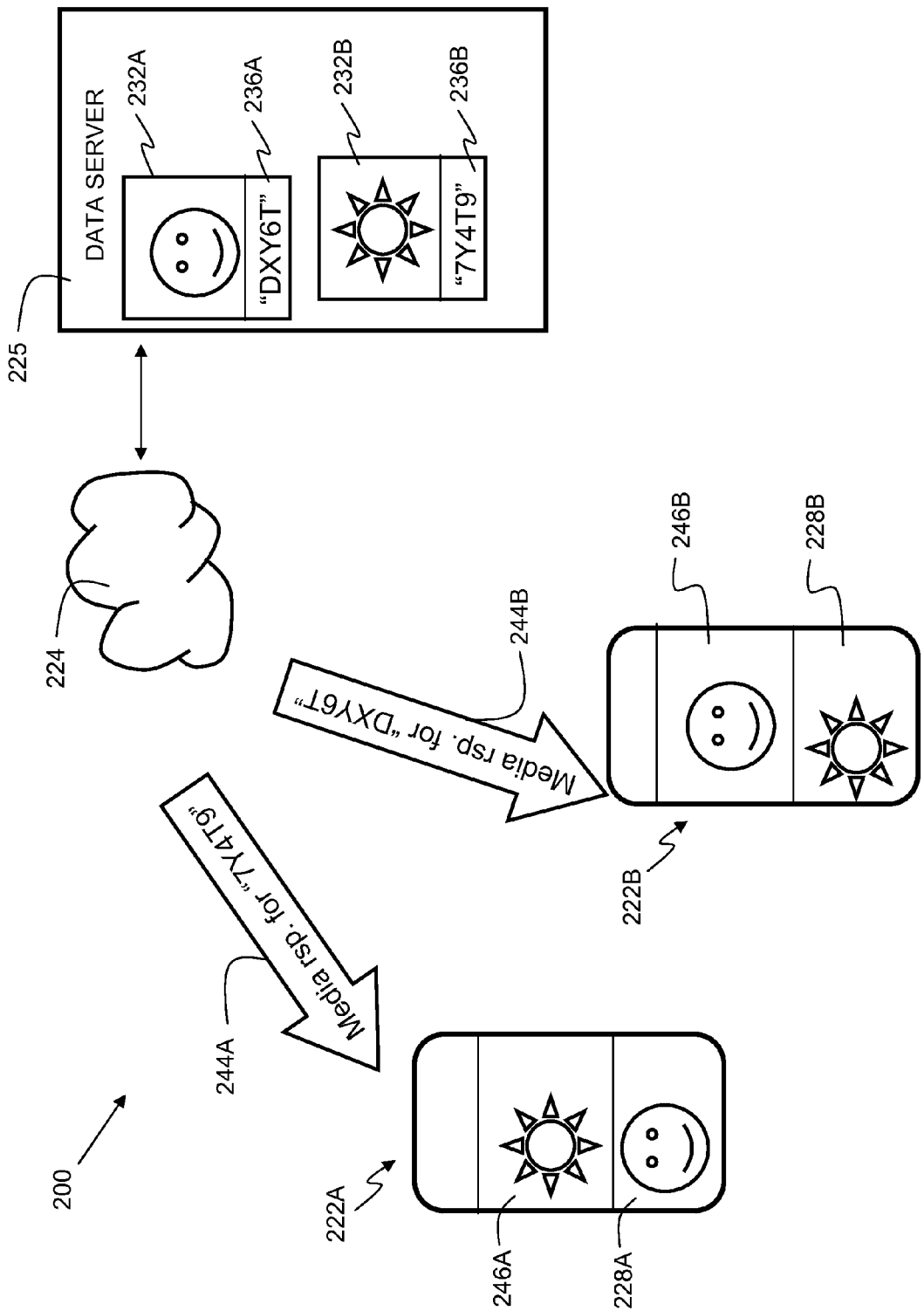
FIG. 2D shows a block diagram of a media sharing example illustrating a media response process.

FIG. 2D shows block diagram 200 of a media sharing example illustrating a media response process. In this process, the data server 225 sends the requested media items to the corresponding mobile device. Thus, the media response 244A is sent to mobile device 222A, and includes media item 246A. Media item 246A is a copy of media item 232B from data server 225 which is a copy of media item 228B taken by mobile device 222B. Similarly, the media response 244B is sent to mobile device 222B, and includes media item 246B. Media item 246B is a copy of media item 232A from data server 225 which is a copy of media item 228A taken by mobile device 222A. Thus mobile devices 222A and 222B have shared media with each other, based on being in substantially the same area (proximity) at substantially the same time. Thus, a proximal and temporal relationship between mobile device 222A and mobile device 222B enables them to share media items with each other.

Figure 2E:
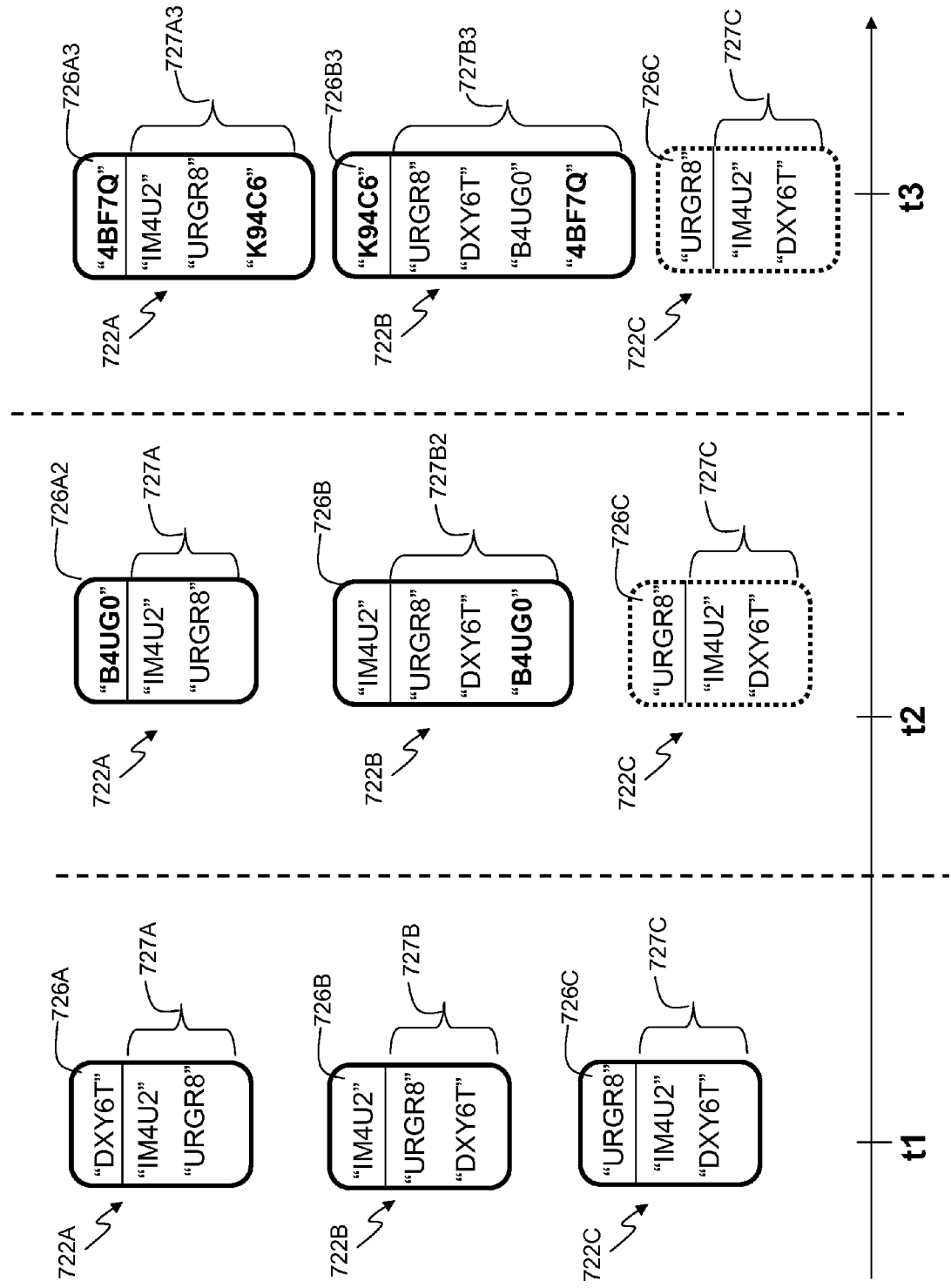
FIG. 2E illustrates changing device IDs.

In embodiments, the device ID may be updated during operation. The updating of the device ID may be done to limit how long data sharing can take place between nearby mobile devices. For example, while users may wish to share media items with others at the same event, they may not want to share all media items indefinitely. Hence, by periodically generating and broadcasting a new device ID, an additional degree of privacy can be enforced by not sharing unlimited media items with mobile devices that have left an event. An example of changing device IDs is illustrated in FIG. 2E. Three mobile devices (722A, 722B, and 722C) have each other's device IDs at time t1. The remote devices IDs stored in mobile device 722A are indicated by reference 727A. The remote devices IDs stored in mobile device 722B are indicated by reference 727B. The remote devices IDs stored in mobile device 722C are indicated by reference 727C. At time t1, the local device ID of each device is indicated as 726A for device 722A, 726B for device 722B, and 726C for device 722C. At time t2, device 722C leaves the event. That is, device 722C is no longer within the local transceiver range of device 722A and device 722B. At time t2, device 722A changes its local device ID as indicated by reference 726A2. Device 722B is still within the local transceiver range of device 722A and updates its list of remote device IDs 727B2 accordingly. Note that the list of remote IDs 727B2 now includes the remote device ID "B4UG0." Since device 722C is out of range, and has not received the new remote device ID "B4UG0," it cannot receive new media items acquired by device 722A. However, it still can continue to receive media items from device 722B, since it still stores its current device ID 726B in its list of remote device IDs 727C. In some embodiments, device 722C may broadcast a disconnect message via the local transceiver prior to leaving the event. For example, if the user closes their photo app and/or puts their device in standby, a disconnect message may be broadcast to nearby device IDs, which can cause those devices to generate a new device ID. However, there may be times where a user simply walks out of range, and thus, in some circumstances, a disconnect message may not be sent. At time t3, device 722B changes its local device ID as indicated by reference 726B3. Device 722A is still within the local transceiver range of device 722B and updates its list of remote device IDs 727A3 accordingly. Similarly, device 722A generates a new device ID 726A3 which is received by device 722B and stored in its list of remote IDs 727B3. Hence, devices 722A and 722B can continue to share media items, as they are still in proximity to one another. At time t3, device 722C is no longer eligible to receive media items from device 722A or device 722B, since it is out of range, and does not have the new device IDs necessary to receive new content. In this way, it is possible to have control over how much data is shared. Some users may not want to share data with other users after they have left the event. In the most restrictive sharing mode, a new device ID is generated for each new media item that is acquired. For example, a new device ID can be generated for each photo or video taken. While this embodiment offers the most control over the sharing of media items, it can also generate the most amount of chatter and require mobile devices to store more remote device IDs. In other embodiments, the device ID is updated on a periodic basis, such as once every five minutes. In other embodiments, changing the internal device identifier is based on a user action. For example, a user may manually update the device ID by taking some action with the mobile device such as pressing a button. In some embodiments, a vigorous shake back and forth may be used to signal that a new device ID is to be used. The accelerometer of the mobile device can be used to detect the vigorous shake. In embodiments, a shaking back and forth at a rate between 2 Hz to 5 Hz may be used to trigger the generation of a new device ID. In other embodiments, pressing a shutter button for an extended period, or providing additional pressure when the shutter button is pressed, can be used to initiate the generation of a new device ID. Such a use case may include when a user is about to take an important photograph, and only wishes to share it with other users who are there right now, and not with users who may have recently left the proximity of the event. By forcing a new device ID to be generated, only mobile devices that are currently within local transceiver range can receive the new media items.

Figure 3A:
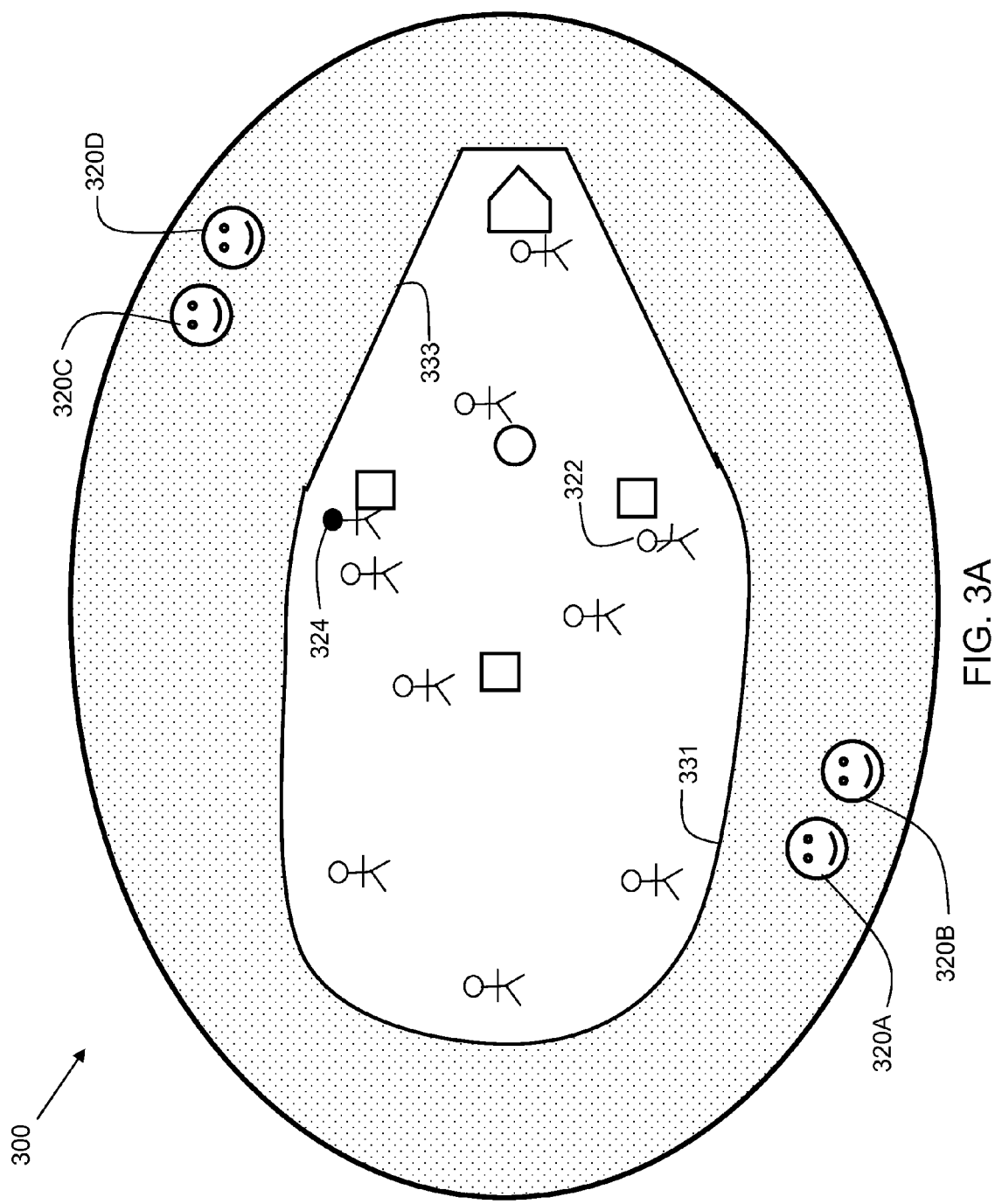
FIG. 3A shows an example of a large venue for use with alternative embodiments of the present invention utilizing range expansion.

FIG. 3A shows an example of a large venue 300 for use with alternative embodiments of the present invention utilizing range expansion. Range expansion is a process by which devices that are relatively near to each other can share media, even if they are situated beyond the local transmission range from each other. In such embodiments, the data server provides a mechanism for media sharing amongst the mobile devices. This type of scenario can occur at a large venue. Large venue 300 is a baseball field, used for the purposes of illustrating examples of these embodiments. A large venue is any venue where the size of the venue is larger than the local transceiver range. Thus, a large venue can include a football field, soccer field, outdoor concert, among others. Referring again to large venue 300, four spectators are indicated as 320A, 320B, 320C, and 320D. Spectators 320A and 320B are seated along the left field side 331, and have a good vantage point for photographing third baseman 322, while spectators 320C and 320D are seated along the first base line 333, and have a good vantage point for photographing base runner 324. Spectators 320A and 320B are seated near each other, within the local transceiver range, and thus can share media as depicted in FIGS. 2A-2D. Similarly, spectators 320C and 320D are seated near each other, within the local transceiver range, and thus can share media as depicted in FIGS. 2A-2D. However, spectator 320A is located too far away from spectator 320C to share media in the manner depicted in FIGS. 2A-2D. That is, the distance between spectator 320A and spectator 320C exceeds the local transceiver range. Yet, spectators 320A, 320B, 320C, and 320D are attending the same venue, and hence, it may be desirable to allow seamless sharing of media items between spectator 320A and spectator 320C, even though they are separated at a distance beyond the local transceiver range. Thus, referring to the details of the example, it would be desirable to allow spectator 320A to receive a photo of the base runner 324 that is taken by spectator 320C. Similarly, it would be desirable to allow spectator 320C to receive a photo of the third baseman 322 that is taken by spectator 320A. Embodiments of the present invention enable this by performing a range expansion, as illustrated in FIGS. 3B-3D that follow.

Figure 3B:
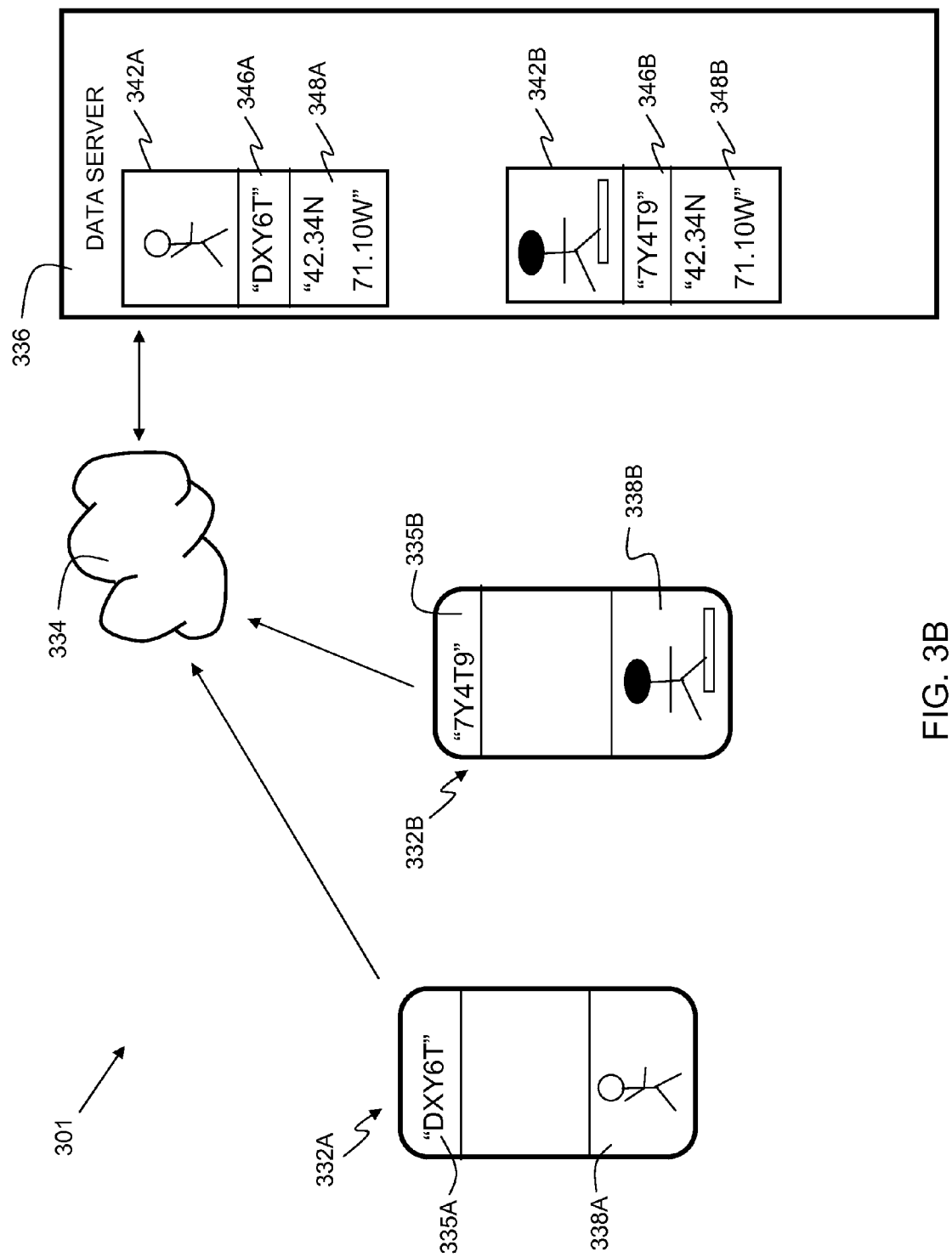
FIG. 3B shows a block diagram of a media sharing example illustrating a media upload process utilizing range expansion.

FIG. 3B shows a block diagram 301 of a media sharing example illustrating a media upload process utilizing range expansion. The upload of media items to data server 336 is similar to the upload of media items described for FIG. 2B, with the key difference being that a geographic location is included as part of the uploaded metadata. Thus, referring again to FIG. 3B, data server 336 receives via network 334 media items 342A and 342B from mobile devices 332A and 332B. The metadata for media item 342A includes device ID 346A and geographical location value 348A. Similarly, the metadata for media item 342B includes device ID 346B and geographical location value 348B. In embodiments, the geographical location value is stored as a latitude-longitude pair.

Figure 3C:
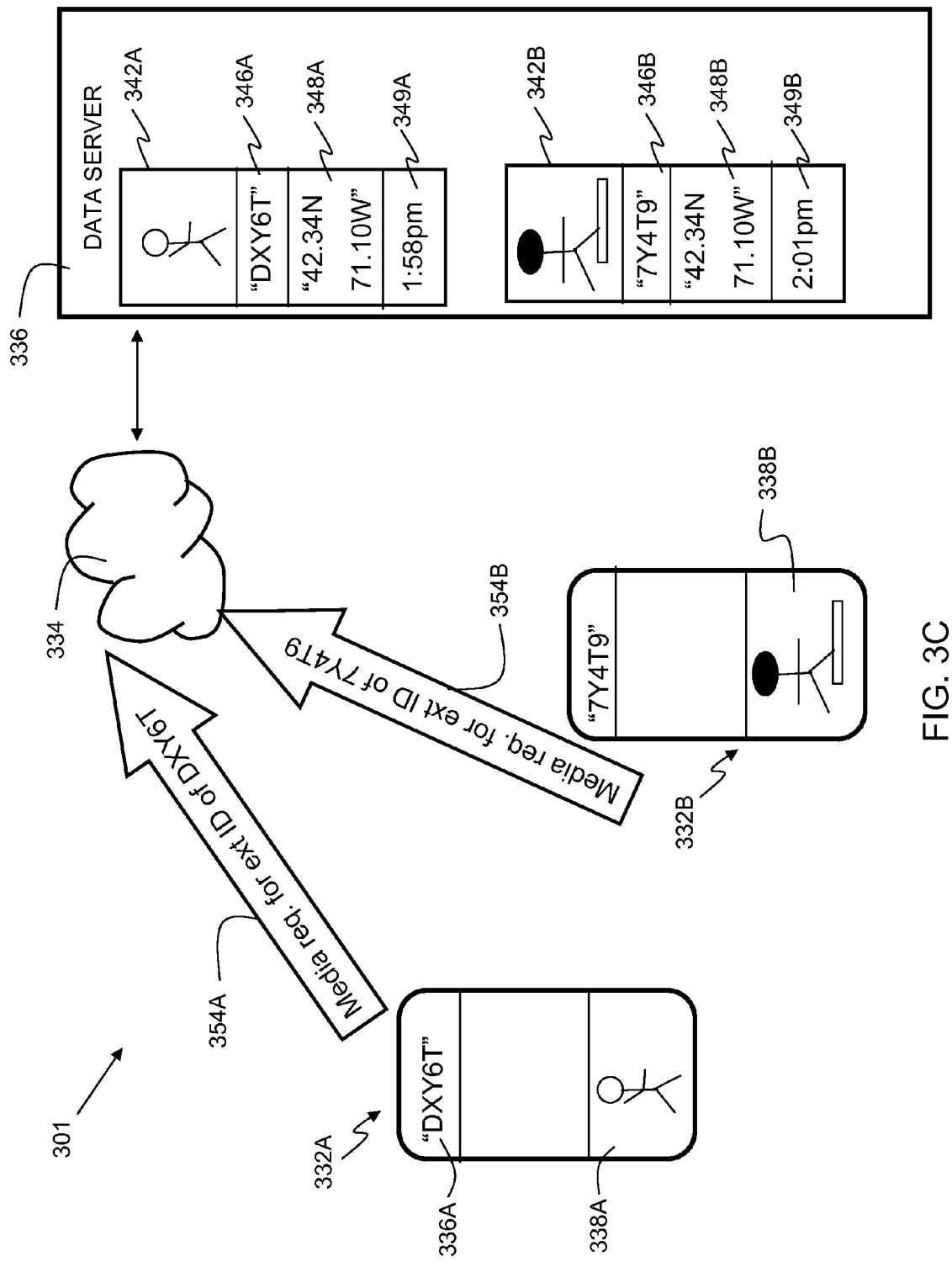
FIG. 3C shows a block diagram of a media sharing example illustrating an expanded media request process.

FIG. 3C shows block diagram 301 of a media sharing example illustrating an expanded media request process. This process is similar to the process illustrated in FIG. 2C in that both FIG. 2C and FIG. 3C show media being requested from a data server. The difference between the process of FIG. 2C and that of FIG. 3C is that in FIG. 2C, the request is made for media acquired by a specific device ID that was received by the local transceiver of the requesting device. In the process shown in FIG. 3C, the device 332A and device 332B are making external media requests. In addition to the geographic location information, the acquisition time is also recorded as part of the metadata for each media item. In this example, media item 342A has an acquisition time 349A of "1:58 pm" and media item 342B has an acquisition time 349B of "2:01 pm." These time formats are for illustrative purposes only. In practice, the time may be stored as a number of seconds from a predetermined epoch such as a GPS time in seconds, or UTC time in seconds, which allows the full date and time for each media item acquisition to be ascertained. For the purposes of example, consider mobile device 332A as belonging to spectator 320A in FIG. 3A, and consider mobile device 332B as belonging to spectator 320C in FIG. 3A. Mobile device 332A has device ID 335A and mobile device 332B has device ID 335B.

Figure 3D:
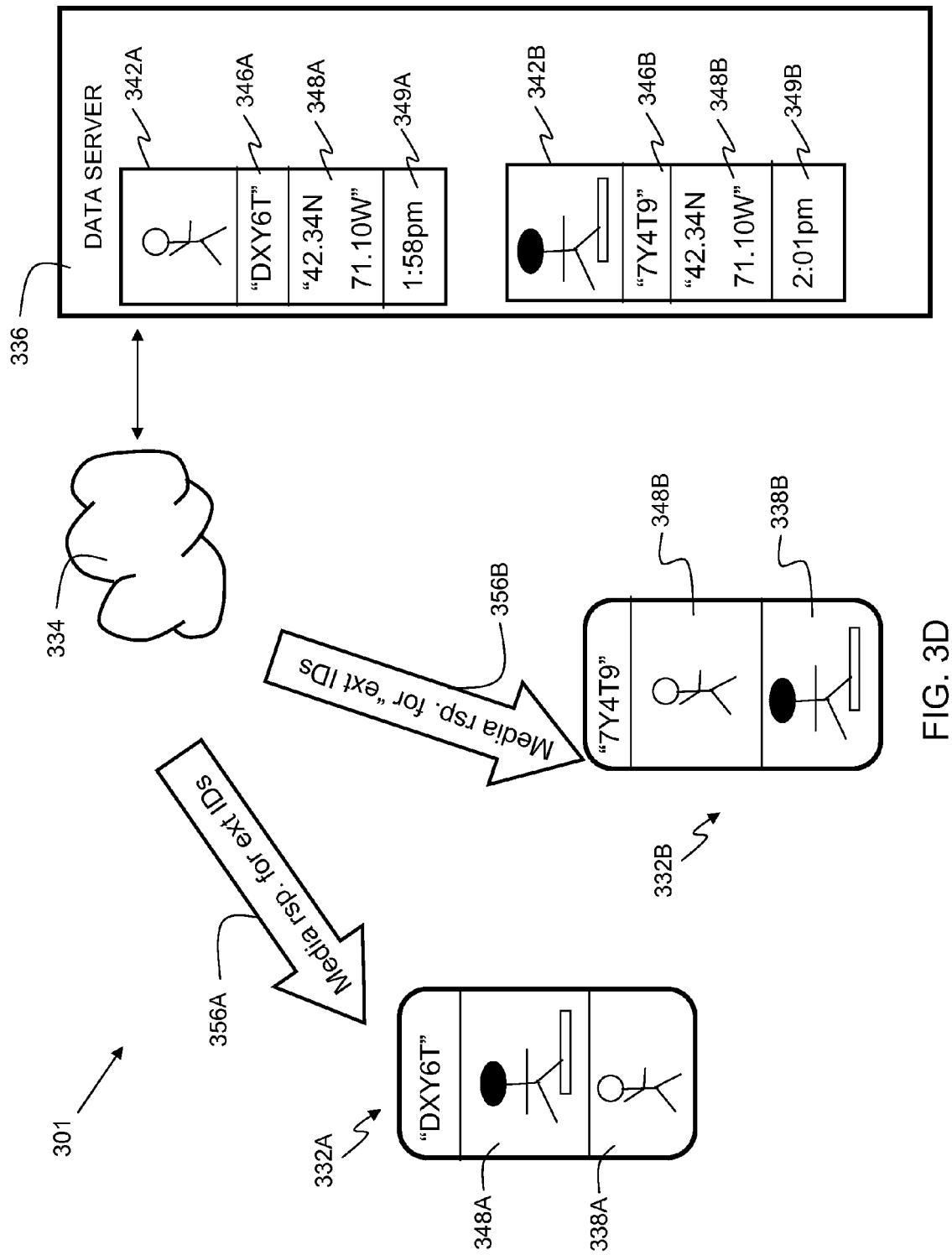
FIG. 3D shows a block diagram of a media sharing example illustrating an expanded media response process.

FIG. 3D shows block diagram 301 of a media sharing example illustrating an expanded media response process. The expanded media responses 356A and 356B are sent in response to external media requests 354A and 354B, respectively, as shown in FIG. 3C. These requests are basically asking the server "please send me media from people who were near me at about the time I was there." During the event (baseball game), mobile device 332A and mobile device 332B were too far apart to share device IDs using the local transceiver. In this case, the data server 336 processes the external media request by reviewing stored media items that have an acquisition time near the time when the requesting device was there, and a location at or near the location of the requesting device. In the case of device 332A, the data server checks its stored media items that meet the criteria, and determines that media item 342B meets the criteria in terms of location and time. In embodiments, the data server may define a window for time and location. For example, if a media item was acquired within a quarter mile of the requester's location and within five minutes of when the requester was there, then a media item is deemed eligible to be sent as part of the expanded media response. In embodiments, the requester's location and time when present at the event may be determined by media items that the requesting device previously uploaded. Thus, in this example, the data server may review data item 342A to determine that media device 332A was present at the event at 1:58 pm at a location of 42.34N-71.10 W, and thus, the media item 342B, being acquired at the same general location and within 3 minutes of the acquisition time of media item 342A, deems media item 342B eligible for sharing with mobile device 332A. As a result, mobile device 332A has media item 348A. Media item 348A is a copy of media item 338B taken by mobile device 332B. By a similar process, mobile device 332B has media item 348B. Media item 348B is a copy of media item 338A taken by mobile device 332A. Hence, the spectators 320A and 320C (see FIG. 3A) are able to seamlessly share media items, even though they may not know each other, but attended the same event, yet sat too far apart from each other to exchange device IDs via their local transceivers of their respective mobile devices. In some embodiments, a combination of local transceivers and range expansion may be used. In some embodiments, local transceivers may not be used, and the determination of the presence of mobile devices is performed by the data server using range expansion. In some embodiments, the media responses 356A and 356B may further include a contact identifier. The contact identifier may in some embodiments be the device ID associated with the media item. For example, the contact identifier for media item 342A may be device ID 346A. The contact identifier may provide for other users to contact the user that took the photos (or other media items) and/or to post a rating for the user's photo or other media items. The data server 336 maintains a link between device ID and other contacting parameters such as a telephone number or email address. In this way, the users that uploaded the shared media items can still remain anonymous, but also receive feedback on their media items.

Figure 4:
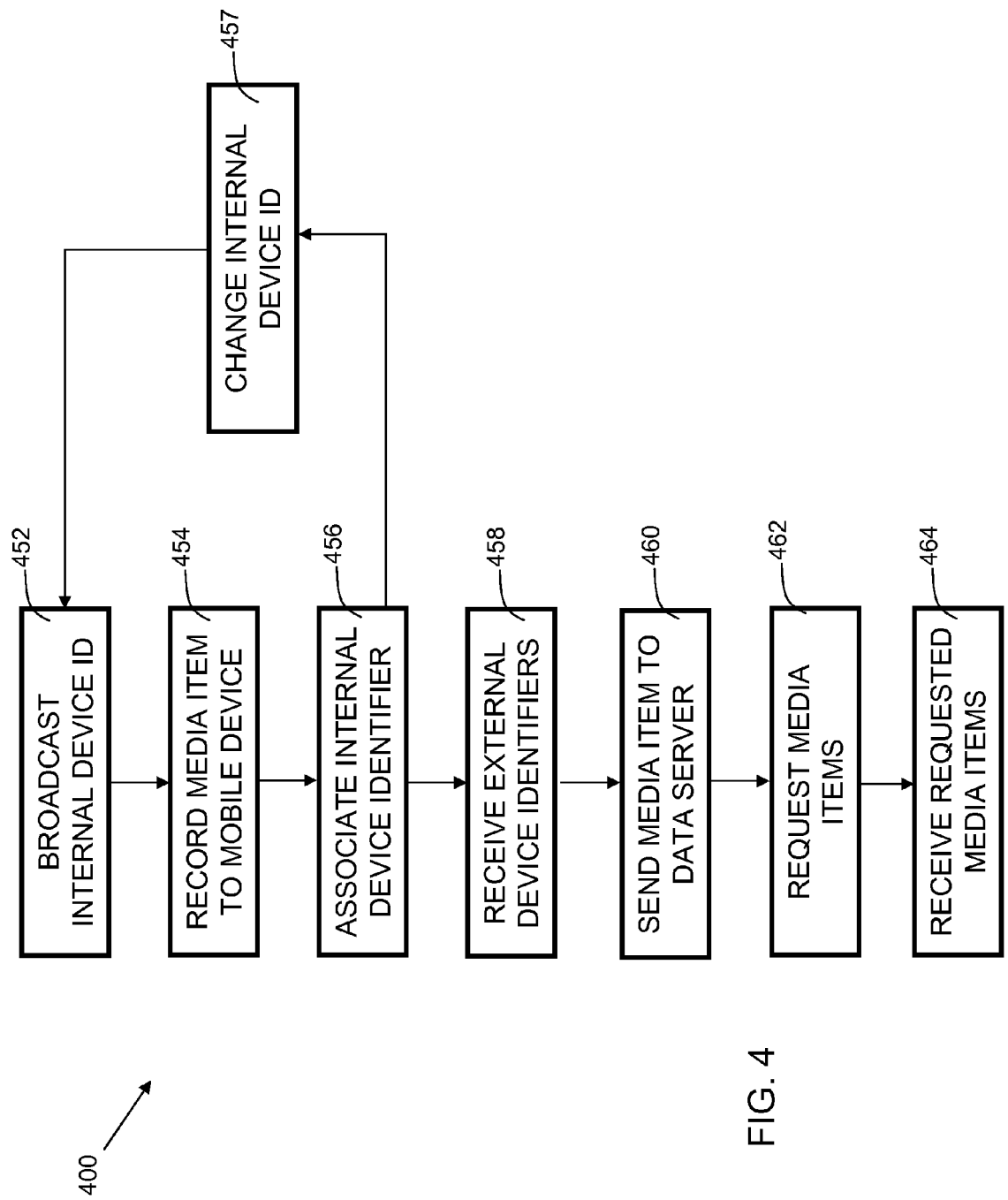
FIG. 4 is a flowchart indicating process steps for embodiments of the present invention.

FIG. 4 is a flowchart 400 indicating process steps for embodiments of the present invention. In process step 452, the internal device ID of a mobile device is broadcast. This may be done using a local transceiver such as a Bluetooth, Zigbee, low power frequency modulation, or other suitable transmission mechanism. In process step 454, one or more media items are recorded to the mobile device. This may include taking digital photos, videos, and/or sound recordings. After each media item is taken, an internal device identifier is associated with the media item in process step 456. The internal device identifier may be part of a metadata structure that includes additional metadata which may include, but is not limited to, date/time of acquisition, and geographic location of the acquisition. In process step 458, external device identifiers are received. These are device IDs from nearby mobile devices that are also being broadcast on their respective local transceivers. Process steps 452-458 may be occurring in an order different than shown, and one or more of process steps 452-458 may be occurring simultaneously. In process step 460, the media items recorded in process step 454 are uploaded to a data server. Process step 460 may take place at some later time than process step 454. In process step 462, media items are requested from the data server. This may include media items having device IDs that match the received external device IDs from process step 458. In process step 464, the requested media items are received. In embodiments, the requested media items are received on the mobile device. In other embodiments, the requested media items may be downloaded to another location, such as a cloud storage account associated with the user. In such an embodiment, the user can then decide which of the received images they wish to keep, print, download to their mobile device, or other option. In such an embodiment, media items that do not interest the user can be discarded without needing to download them to the user's mobile device. Optionally, the internal device ID may change at process step 457. In some embodiments, the change is periodic, such as changing every five minutes. In some embodiments, the change can be based on a user action, such as a button press. In some embodiments, the device ID can change after each new media item is acquired, or after a predetermined number of media items are acquired, such as. for example, changing the device ID after every three photos that are taken by the mobile device.

Figure 5:
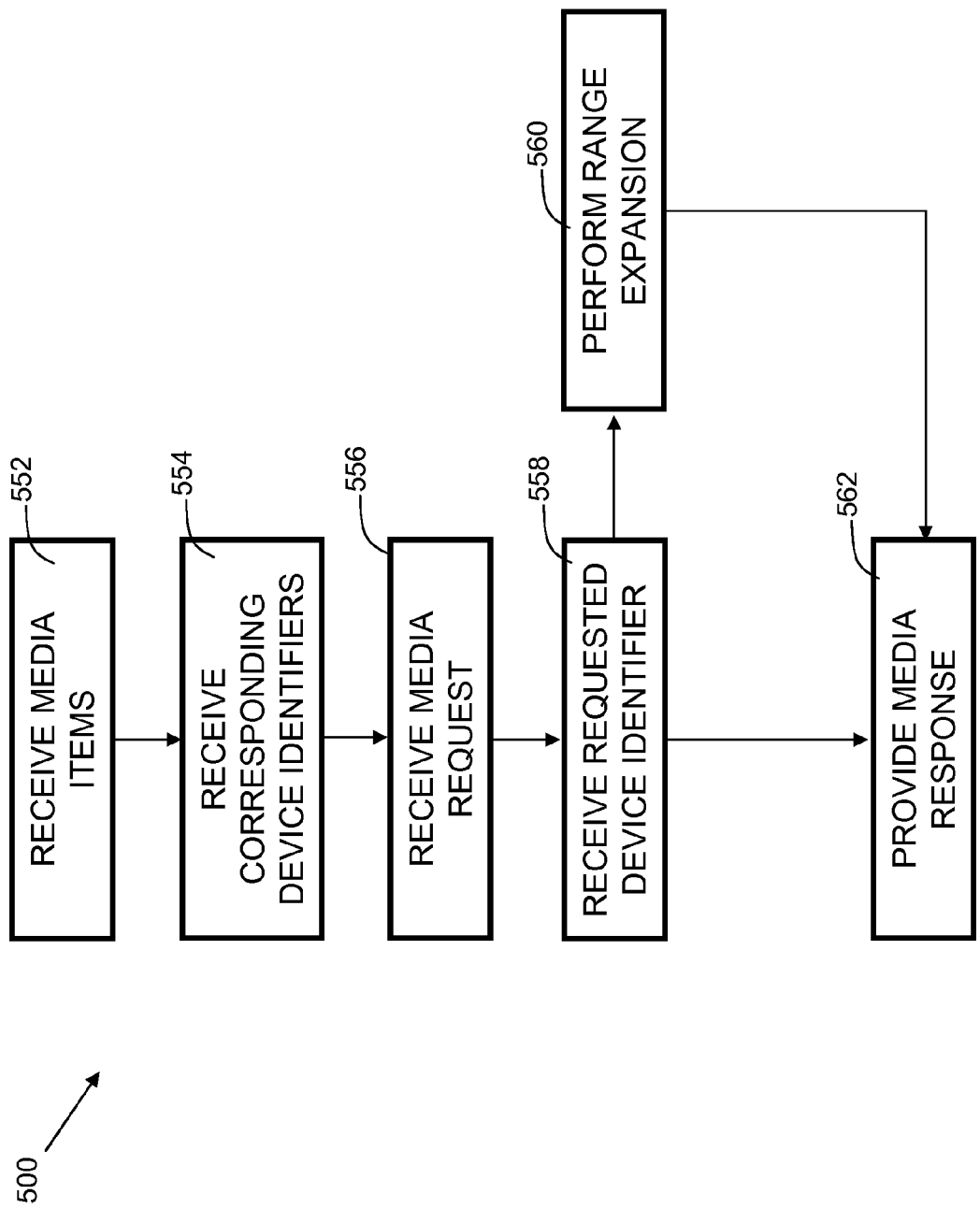
FIG. 5 is a flowchart indicating process steps for additional embodiments of the present invention.

FIG. 5 is a flowchart 500 indicating process steps for additional embodiments of the present invention. In process step 552, media items are received from a plurality of mobile devices. In process step 554, corresponding device IDs for the media items are received. Note that in practice, process step 552 and process step 554 may be performed simultaneously, such that the media item and corresponding device identifier are received together. In process step 556, a media request is received from one or more mobile devices. Each media request may contain one or more device IDs from which media is requested. In process step 558, a requested device identifier is received. The requested device ID refers to the mobile device for which media items are being sought. Note that in practice, process step 556 and process step 558 may be performed simultaneously, such that the media request and corresponding device identifier are received together. In process step 562, a media response is sent which may include the media corresponding to the requested device identifier from process step 558. Optionally, range expansion can be performed on the device ID at process step 560 if the received media request is an external media request. In the case of an external media request, the requested device identifier may be that of the requesting mobile device (as illustrated in the example of FIG. 3C), or in some embodiments, a remote device ID may be used in the external media request. In embodiments, the functionality indicated by flowchart 500 may be performed at least in part by the data server (such as data server 226 of FIG. 2B or data server 336 of FIG. 3C).

Figure 6:
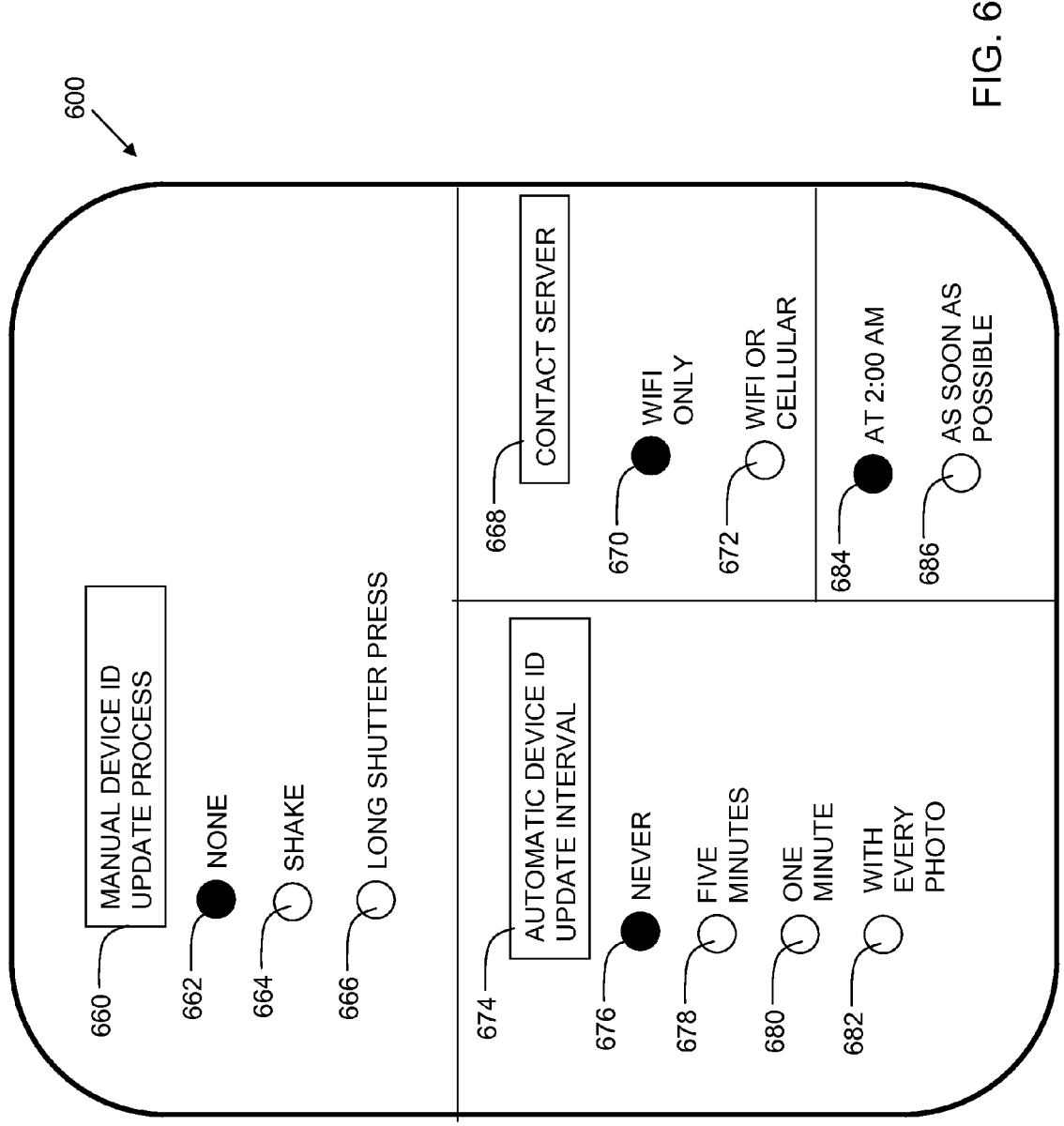
FIG. 6 is an exemplary user interface for settings for a mobile application in accordance with embodiments of the present invention.

FIG. 6 is an exemplary user interface 600 for settings for a mobile application in accordance with embodiments of the present invention. The user interface is divided into multiple sections. Section 660 allows selection of a manual device ID update process. In embodiments, options include none 662, shake 664, and long shutter press 666. As shown, option 662 is currently selected. Option 664 allows a new device ID to be generated when the mobile device is briefly shaken. In embodiments, the device is shaken at a rate of 2 Hertz to five Hertz to signify a new device ID is to be generated. Option 666 allows a new device ID to be generated when a long shutter press is performed by the user. For example, if the user presses and holds the shutter button for five seconds, a new device ID may be generated.

Section 674 allows selection of an automatic device ID update interval. The device ID may be automatically updated at a predetermined time interval. In embodiments, options include never 676, five minutes 678, one minute 680, and with every photo 682. As shown, option 676 is currently selected. The never option increases the amount of sharing of the user's photos (or other media items). The five minute option reduces the amount of sharing, by capping the time that a given device ID is valid at five minutes. Option 680 is yet more restrictive by capping the time that a given device ID is valid at one minute. Option 682 is the most restrictive by changing the device ID with every photo (media item) that is taken by the mobile device.

Section 668 allows selection of server contact options. In embodiments, options include WiFi Only 670 and WiFi or Cellular 672. As shown, option 670 is currently selected. Additional options 684 and/or 686 may also be selectable. These options include 684, which causes the mobile device to perform uploads and downloads at 2:00 a.m. (or some other off-peak time). Option 686 causes the mobile device to perform uploads and downloads as soon as possible. The options shown in FIG. 6 are not intended to be limiting, and other options may be implemented to allow further customization of the user interface.

The mobile device 100 shown in FIG. 1 and the data server shown in FIG. 2A may be described in the general context of computer-executable instructions, such as program modules, being executed by a computer. Generally, program modules include routines, programs, components, logic, data structures, and so on, which perform particular tasks or implement particular abstract data types. Disclosed embodiments may be practiced in distributed computing environments where tasks are performed by remote processing devices that are linked through a communications network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, media sharing, device ID generation, and event determination may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Embodiments of the present invention may also include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Disclosed embodiments provide an approach for sharing media items between mobile devices that are in proximity to one another. A device ID is generated and shared with nearby devices. Media items are uploaded to a data server and then sent from the data server to other devices that request them based on a shared device ID. Users do not need to know each other or be connected to each other in any social media sense, and yet can still share media items. Thus, disclosed embodiments provide a new level of crowd-sourced coverage of an event based on sharing of media items. While embodiments of the invention have been particularly shown and described in conjunction with a preferred embodiment thereof, it will be appreciated that variations and modifications will occur to those skilled in the art. Therefore, it is to be understood that the appended claims are intended to cover all such modifications and changes that fall within the scope of embodiments of the present invention.

What is claimed is:

1. A method of sharing media from a mobile device, the method comprising:
    broadcasting an internal device identifier;
    recording a media item to the mobile device;
    associating the internal device identifier with the recorded media item;
    sending the media item and the associated internal device identifier to a data server;
    receiving one or more external device identifiers from nearby devices;
    requesting media items from the data server based on the received one or more external device identifiers;
    receiving the requested media items;
    recording another predetermined number of media items to the mobile device; and
    changing the internal device identifier upon the recording the another predetermined number of media items to the mobile device.

2. The method of claim 1, further comprising changing the internal device identifier at a predetermined time interval.

3. The method of claim 1, further comprising changing the internal device identifier based on a user action.

4. The method of claim 3, wherein the user action comprises shaking the mobile device at a rate between 2 Hertz and 5 Hertz.

5. The method of claim 3, wherein changing the internal device identifier comprises changing the internal device identifier randomly.

6. The method of claim 1, wherein broadcasting an internal device identifier comprises transmitting the internal device identifier via a local transceiver.

7. The method of claim 1, wherein sending the media item and associated internal device identifier to a data server further includes sending an associated geographical location value.

8. The method of claim 1, further comprising broadcasting a disconnect message.

9. The method of claim 6, wherein the local transceiver includes one of a Bluetooth transmitter, Zigbee transmitter, and a WiFi transmitter.

10. The method of claim 1, wherein the recorded media item is one of a photograph, video file, and audio file.

11. A mobile device comprising:
    a processor;
    a memory coupled to the processor;

a network interface coupled to the processor;
a local transceiver coupled to the processor;
a media recording apparatus coupled to the processor;
a geolocation receiver coupled to the processor;
wherein the memory contains instructions, which when executed by the processor, perform the steps of:
broadcasting an internal device identifier using the local transceiver;
recording a media item from the media recording apparatus to the memory;
associating the internal device identifier with the recorded media item;
sending the media item and the associated internal device identifier to a data server;
receiving one or more external device identifiers from nearby devices;
requesting media items from the data server based on the received one or more external device identifiers;
receiving the requested media items and storing the requested media items in the memory;
recording another predetermined number of media items to the mobile device; and
changing the internal device identifier upon the recording the another predetermined number of media items to the mobile device.

12. The mobile device of claim 11, wherein the memory further comprises instructions for changing the internal device identifier at a predetermined time interval.

13. The mobile device of claim 11, wherein the memory further comprises instructions for changing the internal device identifier based on a user action.

14. The mobile device of claim 13, wherein the memory further comprises instructions for changing the internal device identifier based on user action of shaking the mobile device at a rate between 2 Hertz and 5 Hertz.

15. The mobile device of claim 11, wherein the memory further comprises instructions for changing the internal device identifier randomly.

* * * * *